United States Patent [19]

Libby et al.

[11] Patent Number: 4,942,500
[45] Date of Patent: * Jul. 17, 1990

[54] CAPACITOR TANTALUM SURFACE FOR USE AS A COUNTERELECTRODE DEVICE AND METHOD

[75] Inventors: Stuart E. Libby, Bennington, Vt.; William J. Lindskog, Clarksburg, Mass.; Gilbert Green, Jr., Bennington, Vt.

[73] Assignee: Tansitor Electronics, Inc., Bennington, Vt.

[*] Notice: The portion of the term of this patent subsequent to Oct. 25, 2005 has been disclaimed.

[21] Appl. No.: 319,556

[22] Filed: Dec. 12, 1988

Related U.S. Application Data

[63] Continuation-in-part of Ser. No. 218,635, Jul. 13, 1988, abandoned, which is a continuation of Ser. No. 133,547, Dec. 16, 1987, Pat. No. 4,780,797.

[51] Int. Cl.$^5$ .............................................. H01G 9/00
[52] U.S. Cl. .................................... 361/516; 29/25.03
[58] Field of Search ................ 361/516, 525; 29/570.1

[56] References Cited

U.S. PATENT DOCUMENTS

| | | | |
|---|---|---|---|
| 2,908,849 | 10/1959 | Taylor | 361/516 |
| 3,628,103 | 12/1971 | Booe | 361/516 |
| 4,020,401 | 4/1977 | Cannon et al. | 361/516 |
| 4,523,556 | 6/1985 | Rogers | 361/516 |
| 4,780,797 | 10/1988 | Libby et al. | 29/570.1 X |

Primary Examiner—Donald A. Griffin
Attorney, Agent, or Firm—Ratner & Prestia

[57] ABSTRACT

A counterelectrode and a method for providing the counterelectrode wherein an inherently high effective capacitance surface is formed on tantalum. The oxide forming ability of the tantalum surface is destroyed by removing existing oxide from the surface, depositing on the surface a layer of a platinum family metal, and alloying the deposited metal with the tantalum thereby forming an alloy layer. A second layer of metal, also selected from the platinum family, may then be deposited over the alloy layer. Alternately the platinum family metal may be sputtered or clad onto the surface of the tantalum with or without an alloying step. The second deposition produces a spongy layer and is accomplished by conventional electrolytic techniques.

12 Claims, 3 Drawing Sheets

CAPACITOR TANTALUM SURFACE FOR USE AS A COUNTERELECTRODE DEVICE AND METHOD

This application is a continuation-in-part of application Ser. No. 218,635 filed July 13, 1988, now abandoned, which is a continuation of application Ser. No. 133,547 filed Dec. 16, 1987, now U.S. Pat. No. 4,780,797 issued Oct. 25, 1988.

BACKGROUND OF THE INVENTION

A. Field of the Invention

This invention relates to capacitors and in particular to an electrolytic capacitor counterelectrode having a tantalum surface.

B. Background Art

The counterelectrode in a wet-type tantalum capacitor must present a very low impedance to an AC signal if the capacitance of the anode element is to be the determining factor in the capacitance of the finished capacitor. This is generally accomplished by either the use of a porous tantalum sintered body with high specific capacitance, as in the all tantalum types or by deposition of a spongy layer of a member of the platinum group metals, as in the silver case types.

The ability to produce an effective surface on the case wall of capacitors where the inner surface of the case consists of tantalum is desirable economically in parts using wholly tantalum cases. It is a necessity for laminated case parts where the nature of the laminated structure makes sinter or welding of a porous cathode body into the case impossible.

The ability of tantalum to form a thin, adherent, dielectric oxide is the basis for tantalum capacitors but is also the primary problem in using a tantalum surface for a counterelectrode. It is impossible, from a practical standpoint, to keep a tantalum surface oxide free and the specific capacitance of an oxidized surface, either smooth or etched, is far too low to make a satisfactory counterelectrode.

Furthermore, the presence of even the thinnest of air oxides precludes the use of electrolytic or electroless deposition of a noble metal as has traditionally been done in silver case parts. This is because the air oxide does not conduct electricity and deposition will only take place upon small breaks in the oxide.

A solution to this problem has been to find a method of treating the tantalum surface that destroys its ability to form an oxide. Any method, to be considered, must be physically and chemically compatible with all the materials present in the case construction.

U.S. Pat. No. 4,523,255 issued Jan. 11, 1985 to Rogers teaches destroying the oxide forming ability by converting a thin layer of the tantalum surface to tantalum carbide. This layer did not have any great effective capacitance by itself but, more importantly, its nonmetallic nature limited the choices available for the required secondary treatment. Rogers further taught the use of a carbon layer deposition from a colloidal dispersion of graphite. However, the graphite layer did not adhere well to the tantalum carbide surface and in many ratings relied upon the addition of "depolarizing" agents to the capacitor electrolyte.

U.S. Pat. No. 3,628,103 issued to Booe, disclosed forming on virtually any metal an inner layer of platinum on a cathode of a wet electrolyte capacitor. Tantalum in particular is not specified.

SUMMARY OF THE INVENTION

A counterelectrode and a method for providing the counterelectrode wherein an inherently high effective capacitance surface is formed on tantalum. The oxide forming ability of the tantalum surface is destroyed by forming a thin layer of an alloy of tantalum and one of the metals of the platinum family. The technique used in producing the alloy layer may be one of the following: (1) the platinum family metal is deposited by electroless plating after a suitable pretreatment of the tantalum surface to remove the preexisting oxide; (2) the platinum family metal is deposited in a thin film by a sputtering process; or (3) the platinum family metal is clad or roll bonded to the tantalum. The alloy is then formed by a suitable heat treatment. In the sputtering technique, if the oxide on the tantalum surface is removed by glow discharge before the sputter step, the alloy is formed directly and the heat treatment step is then not necessary. Likewise, if the roll bonding is a hot roll bonding technique, it may not be necessary to carry out a subsequent heat treatment. Once the alloy layer is in place, the treated cases, or cases drawn from stock so treated, can then have a spongy layer of a platinum family metal deposited on the counterelectrode surface by conventional electrochemical methods.

DETAILED DESCRIPTION OF THE INVENTION

Figure 1:
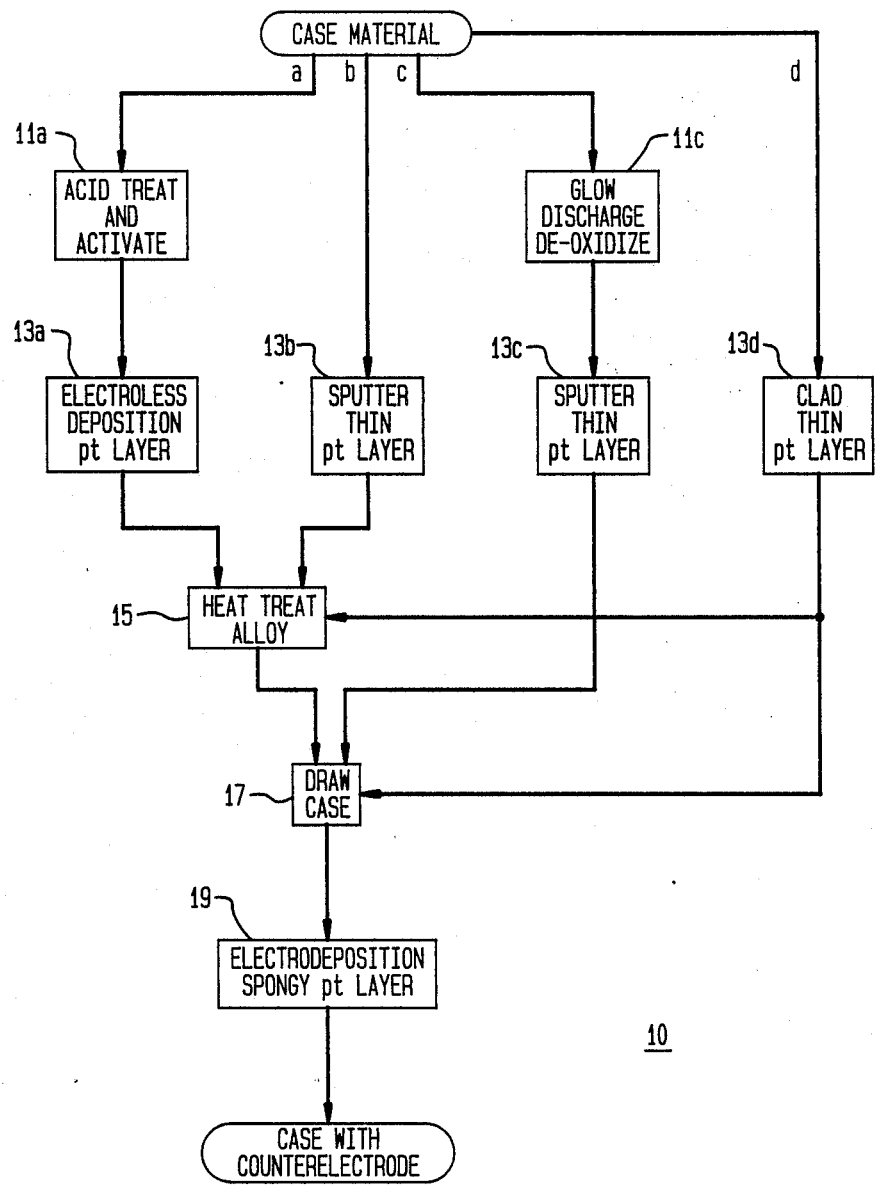
FIG. 1 shows a flow chart representation of the method of the present invention for preparing a tantalum surface for use as a counterelectrode.

Referring now to FIG. 1 there is shown method 10 for preparation of a tantalum surface for use as a counterelectrode in tantalum "wet slug" capacitors. Method 10 may proceed by four paths, labelled 10a, 10b, 10c, and 10d. FIGS. 2A–2D show the surface of a portion of tantalum 20 being treated according to method 10 of the present invention. Method 10 may be used on stock from which cases are to be drawn. With appropriate fixturing and technique, method 10 may also be applied to the inner surface of already drawn cases or any other tantalum surface.

In block 11a the surface of tantalum 20 to be processed is treated with a solution containing a small amount of hydrofluoric acid to remove or destroy the existing air oxide which has formed on the surface of tantalum 20. The surface of tantalum 20 is also treated with an activator such as a stannous salt or an organic reducing agent. The activator reacts with the surface of tantalum 20, wets and cleans it, and provides seeding for adherence of material required to destroy the oxidizing ability of the surface of tantalum 20.

Figure 2A:
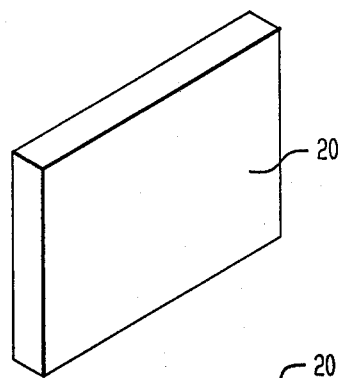
FIGS. 2A–2D show steps in the formation of the counterelectrode of the present invention.
Figure 2B:
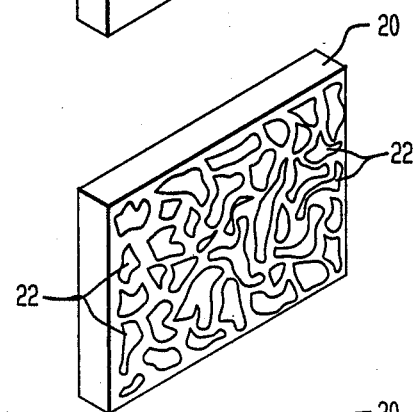

In block 13a a non-continuous layer of small island-like structures 22 of a member of the platinum group of metals is deposited upon the surface of tantalum 20 using conventional electroless plating solution techniques as shown in FIG. 2B. Discontinuous sections or islands 22 are formed, rather than a continuous layer of the platinum group member, because, even after activation, it is extremely difficult to deposit a platinum group member upon a tantalum surface using electroless plating methods. Coverage of as little as 20% of the surface with islands 22 can be sufficient.

The members of the platinum group which are believed to be suitable for the capacitor counter-electrode of the present invention include Ru, Rh, Pd, Os, Ir, and Pt. It is also believed that of the members of the platinum group, palladium is preferrd because it results in the highest inherent capacitance and thereby provides the most efficent capacitor.

Figure 2C:
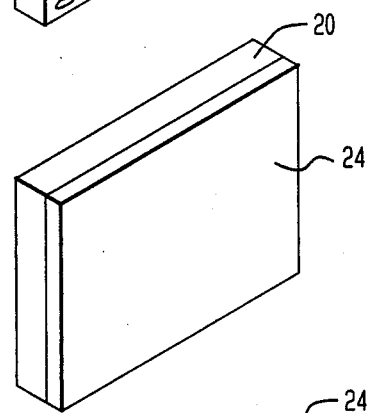
Figure 2D:
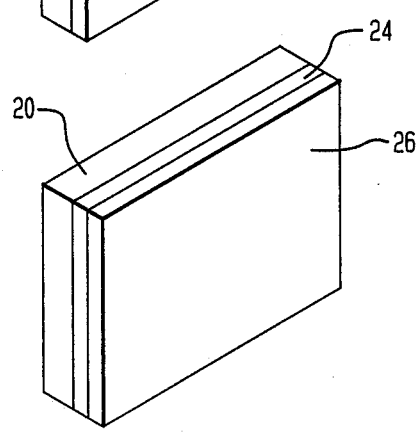

Deposit 22 is alloyed with the surface of tantalum 20 in block 15 by heat treatment thereby mixing the member of the platinum group with the tantalum at a molecular lever. The alloying step of block 15 forms alloy layer 24 as shown in FIG. 2C. The heat treatment of block 15 is performed in a vacuum or in an inert atmosphere to prevent oxidation of tantalum 20. The temperature required to perform this alloying depends on which member of the platinum group is used. The lower temperature limit for each member of the platinum group is that temperature which gives enough alloying to ensure adherence of the deposited platinum group member. This is required to destroy the ability of the tantalum surface to form a dielectric oxide as previously described.

The upper temperature limit for each member is more difficult to determine than the lower limit. It is believed that bulk alloying is not desirable and that the temperature should not be raised to a level which causes bulk alloying. Furthermore, the temperature should be kept below a level which would cause appreciable loss of material through vaporization.

It is thus believed that a suitable temperature range for alloying palladium with tantalum may be about 825° C. to about 1400° C., for alloying platinum with tantalum a suitable temperature range may be about 925° C. to about 1500° C. and that for alloying rhodium to tantalum a suitable temperature range may be about 975° C. to about 1650° C. It is also believed that osmium and iridium require higher temperatures. It will be understood by those skilled in the art that alloying temperatures may be chosen appropriately for the specific combination of metals selected.

Additionally, these temperatures are limited by the type of materials upon which method 10 is performed. For example, if method 10 is performed upon tantalum 20 which is part of a clad of tantalum and some other metal the maximum temperature of alloying must be below approximately 1000° C. to prevent damage to the cladding bond.

When deposit 22 is alloying with the surface of tantalum 20, an alloy layer 24, adhering to the surface of tantalum 20, is formed as previously described. The resulting alloy layer 24 may still be discontinuous. The alloy surface may be composed of as little as 0.25 atomic percent and still give satisfactory results. The surface of alloy layer 24 is suitable for electrodeposition of a member of the platinum group upon alloy layer 24. Thus, the surface of tantalum 20, which was not suitable for electrodeposition, is now covered with alloy layer 24 which is suitable for such deposition, thereby permitting the formation of a counterelectrode which has inherently high effective capacitance.

For the initial deposition 22 shown in FIG. 2B, the platinum group member may be sputtered onto the surface of tantalum 20 as shown in blocks 13b and 13c. It is believed that if the original oxide layer from the surface of tantalum 20 is removed, by glow discharge as shown in block 11c of path 10c of method 10, the sputtering of block 13c may result in a mixing of the tantalum and the sputtered material at the molecular level thereby eliminating the alloying step of block 15 to form alloy layer 25 since the material sputtered onto tantalum 20 forms layer 24 if the sputtering energy is high enough. If the oxide layer is not removed from the surface of tantalum 20 as shown in block 11c, the sputtered member of the platinum group forms deposits 22 as previously described and the alloying step of block 15 is required to form alloy layer 24 because the oxide layer remains between the sputtered material and tantalum 20.

Additionally, it is believed that a tantalumplatinum group member alloy may be sputtered directly onto tantalum 20 thereby eliminating the alloying step of block 15.

As shown in path 10d, the platinum family metal may be clad, as by roll bonding, to the tantalum. The cladding forms an alloy of tantalum and the platinum family member and, if the platinum family metal is sufficiently thin, the alloy layer will be discontinuous, as a result of the molecular interpenetration of the two materials.

The cladding may be conducted by explosive bonding, preferably by roll bonding. Optionally, the tantalum surface may be cleaned first. Either hot or cold roll bonding may be employed. One or more additional hot or cold rolling steps with intermediate anneals may be carried out to obtain the desired gauge. The hot roll bonding technique may be used to form the alloy directly, thus avoiding the need for the separate heat treat/alloy step 15.

After the alloying is complete and alloy layer 24 of tantalum with platinum or a member of the platinum group is formed on tantalum 20, the case is drawn in block 17 and a secondary layer 26 is formed as shown in block 19. Secondary layer 26 may be any member of the platinum group and need not necessarily be the same platinum group member that was alloyed with tantalum 20 in alloy layer 24. Secondary layer 26 may be formed using conventional electrolytic or electroless techniques since it must adhere to platinum or platinum group member alloy layer 24 rather than to a tantalum surface.

The deposition of secondary layer 26 shown in block 19 is performed under conditions that produce a spongy physical structure. It is well known in the art how to choose electrical current levels during deposition and how to choose plating solutions in order to provide a spongy surface rather than a smooth surface for layer 26. The spongy surface is preferred because it provides more surface area for electrical contact with an electrolyte.

Layers 24,26 are highly adherent to tantalum 20 and therefore layers 24,26 are highly adherent to a case wall of a capacitor formed using method 10. This eliminates the problem of conductive particles becoming free and mixing in with the electrolyte and maintains the stability of the electrical properties of the counterelectrode.

Thus tantalum 20 is provided with a surface layer 24 which destroys the oxidizing ability of tantalum 20 wherein surface layer 24 over tantalum 20 has an inherently high effective capacitance. Because of this inherently high effective capacitance, capacitors produced with tantalum 20 treated in accordance with method 10 have a reduced reliance on depolarizing agents.

Figure 3:
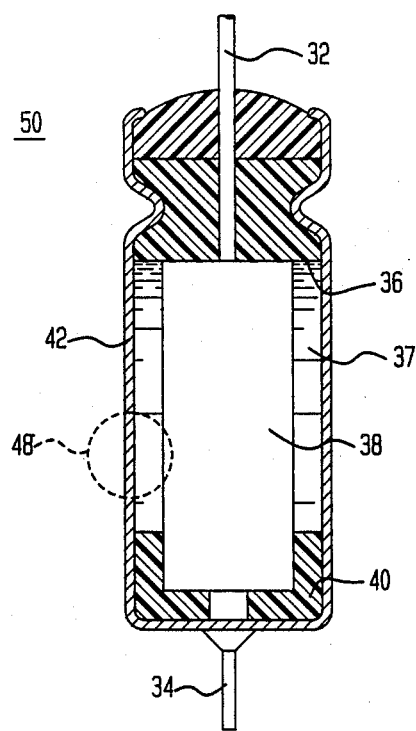
FIG. 3 shows a cross-section of a typical of "wet slug" capacitor which may use the counterelectrode of FIGS. 2A–2D.
Figure 4:
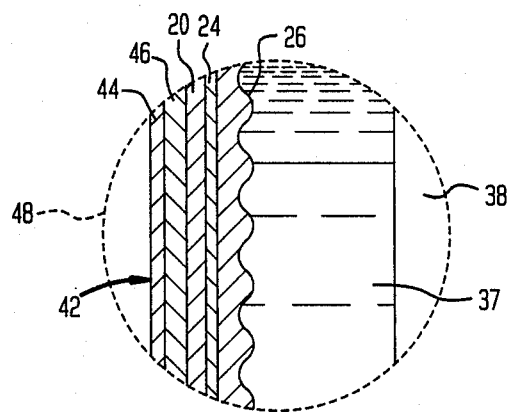

Referring to FIGS. 3 and 4, there is shown capacitor 50 which may include a counterelectrode made according to method 10 of the present invention. It will be understood by those skilled in the art that a counterelectrode made in accordance with method 10 may be used in any other type of wet slug capacitor and that capacitor 50 is merely used by way of illustration.

Capacitor 50 includes porous tantalum annode 38 which is mounted in vibration spacer 40 in the bottom of can 42. The space between gasket 36 and spacer 40 is filled with an electrolyte 37 which impregnates anode 38. Leads 32,34 are electrically coupled to anode 38 and counterelectrode can 42. Can 42 includes nickel or nickel alloy layer 44, copper layer 46, and tantalum layer 20 as shown in magnified portion 48. Tantalum layer 20 has been treated in accordance to method 10 of the present invention to provide alloy layer 24 and spongy secondary layer 26.

Whether method 10 is performed using electroless deposition as shown in path 10a of method 10, by sputtering as shown in paths 10b and 10c, or by cladding as shown in path 10d, all the steps of method 10 may be used either on strip stock before drawing of a capacitor case such as case 42 or on the finished capacitor case itself in which case the step of block 17 is not required. The deposition of secondary layer 26 onto the alloyed surface of layer 24 however must be done on finished case 42 to prevent mechanical damage to layer 26.

The choice between paths 10a,b,c, and d is partly determined by cost. It is believed that the sputtering of paths 10b,c is preferred to the deposition of path 10a. However, sputtering equipment involves a much larger initial cost. Avoiding the deposition of path 10a is preferred, for example, when processing strip stock because one side of strip stock must be masked when chemically treating the other side.

Furthermore, method 10 may be performed upon full tantalum cases as well as those having a laminated or clad structure with tantalum as the inner layer such as case 42 having laminations including nickel layer 44 and copper layer 46. If method 10 is used in making a clad can the layers are first bonded then sputtering or electroless deposition is performed and the alloying is performed but alloying is limited to one thousand degrees, whether on a can or on strip stock, to prevernt damage to the laminations. When the alloying is performed the can is drawn as shown in block 17. Method 10 may also be performed upon a counterelectrode foil (not shown) in a foil-type tantalum capacitor (not shown). The preferred use for method 10 is in a triclad can such as can 42 of capacitor 50 in which a copper layer 46 is disposed between an inner tantalum layer 20 and an outer nickel alloy layer 44. Most commonly the outer nickel alloy layer 44 is an alloy of nickel and copper.

It is claimed:

1. In an electrolytic capacitor comprising a porous tantalum anode, a liquid electrolyte, and a metal container cathode, said cathode having an inherently high effective capacitance inner tantalum surface, the improvement comprising an alloy layer formed over the tantalum surface, said alloy layer comprising tantalum and a platinum family metal.

2. A method for providing an inherently high effective capacitance counterelectrode surface on tantalum for use in an electrolytic capacitor, comprising: cladding a thin layer of a platinum family metal on the tantalum, thereby forming a platinum family member/tantalum alloy layer.

3. A method of claim 2 further comprising removing oxide from the tantalum prior to cladding.

4. A method of claim 3 in which the oxide is removed by treating the surface of the tantalum with an acid.

5. A method of claim 4 in which the acid is hydrofluoric acid.

6. A method of claim 2 in which the cladding is by cold welding under pressure.

7. A method of claim 6 further comprising the step of heat treating after cold welding to sinter the platinum family metal to the tantalum.

8. A method of claim 2 in which the cladding is by hot bonding under pressure.

9. A method of claim 2 in which the platinum family metal is selected from platinum or palladium.

10. A method of claim 2 further comprising the step of depositing over the platinum family member/tantalum alloy layer a layer of a platinum family member.

11. A counterelectrode for a tantalum electrolytic capacitor having an inherently high effective capacitance inner tantalum surface, comprising an alloy layer of a platinum family metal roll bonded to the tantalum surface.

12. A counterelectrode of claim 11 in which the platinum family metal is selected from platinum and palladium.

* * * * *